(12) United States Patent
Taillefer et al.

(10) Patent No.: US 7,725,305 B2
(45) Date of Patent: May 25, 2010

(54) PARTIAL VIRTUALIZATION ON COMPUTING DEVICE

(75) Inventors: Martin Taillefer, Redmond, WA (US); Bruno Silva, Clyde Hill, WA (US); Stanley W. Adermann, Redmond, WA (US); Landon M. Dyer, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 11/450,233

(22) Filed: Jun. 8, 2006

(65) Prior Publication Data

US 2007/0288228 A1    Dec. 13, 2007

(51) Int. Cl.
*G06F 9/455* (2006.01)
(52) U.S. Cl. ............................................. 703/23; 718/1
(58) Field of Classification Search .................. 703/23, 703/26, 27; 709/223; 718/1; 717/148, 136, 717/174, 100; 463/16, 43; 713/2; 711/6, 711/163, 206; 468/16
See application file for complete search history.

(56) References Cited

U.S. PATENT DOCUMENTS

| | | | |
|---|---|---|---|
| 5,937,185 A | 8/1999 | Weir et al. | |
| 6,009,476 A | 12/1999 | Flory et al. | 709/301 |
| 6,075,938 A * | 6/2000 | Bugnion et al. | 703/27 |
| 6,496,847 B1 * | 12/2002 | Bugnion et al. | 718/1 |
| 6,799,316 B1 | 9/2004 | Aguilar et al. | 718/1 |
| 7,111,145 B1 * | 9/2006 | Chen et al. | 711/206 |
| 7,281,102 B1 * | 10/2007 | Agesen et al. | 711/163 |
| 2003/0061401 A1 | 3/2003 | Luciani, Jr. | 709/324 |
| 2003/0061497 A1 | 3/2003 | Zimmer | 713/189 |
| 2005/0076324 A1 * | 4/2005 | Lowell et al. | 717/100 |
| 2006/0004554 A1 | 1/2006 | Vega et al. | 703/6 |
| 2006/0005186 A1 | 1/2006 | Neil | 718/1 |
| 2006/0005190 A1 | 1/2006 | Vega et al. | 718/1 |
| 2006/0020781 A1 | 1/2006 | Scarlata et al. | 713/100 |
| 2006/0031060 A1 | 2/2006 | Weissmann | 703/27 |
| 2006/0046824 A1 * | 3/2006 | Silva et al. | 463/16 |
| 2006/0123416 A1 * | 6/2006 | Bertolotti et al. | 718/1 |
| 2006/0248527 A1 * | 11/2006 | Jaeckel et al. | 718/1 |
| 2006/0281556 A1 * | 12/2006 | Solomon et al. | 463/43 |
| 2007/0006218 A1 * | 1/2007 | Vinberg et al. | 717/174 |
| 2007/0016895 A1 * | 1/2007 | Tan | 717/136 |
| 2007/0074192 A1 * | 3/2007 | Geisinger | 717/148 |

(Continued)

OTHER PUBLICATIONS

Christensen, P., "Ardence™: X86 Virtualization Technology and Windows Based Real-Time Systems", 2006 Ardence, Inc., 6 pages, http://www.ardence.com/assets/2ae657bde2f94e4fb13121cb425ef0d3.pdf.

(Continued)

*Primary Examiner*—Kidest Bahta
*Assistant Examiner*—Kandasamy Thangavelu
(74) *Attorney, Agent, or Firm*—Woodcock Washburn LLP

(57) ABSTRACT

A computing device hosts a virtual machine executing a guest that issues guest hardware requests by way of any of a plurality of paths. Such paths include a path to non-existent virtual hardware, where an emulator intercepts and processes such guest hardware request with a corresponding actual hardware command; a path to an instantiated operating system, where the instantiated operating system processes each such guest hardware request with a corresponding actual hardware request; and a path to device hardware, where the device hardware directly processes each such guest hardware request.

16 Claims, 3 Drawing Sheets

U.S. PATENT DOCUMENTS

2007/0101323 A1* 5/2007 Foley et al. ............. 718/1
2007/0112999 A1* 5/2007 Oney et al. ............. 711/6
2007/0198243 A1* 8/2007 Leis et al. ............. 703/26
2007/0220246 A1* 9/2007 Powell et al. ............. 713/2
2008/0005297 A1* 1/2008 Kjos et al. ............. 709/223

OTHER PUBLICATIONS

Wright, Chris., "Virtually Linux Virtualization Techniques in Linux", *Proceedings of the Linux Symposium*, Jul. 21-24' 2004, 2, 11 pages.

* cited by examiner

PARTIAL VIRTUALIZATION ON COMPUTING DEVICE

TECHNICAL FIELD

The present invention relates to deploying a virtual machine on a computing device. In particular, the present invention relates to deploying the virtual machine on the computing device in a partially virtualized state such that the guest executing within the virtual machine is aware of the virtual state thereof. More particularly, the present invention relates to such a partially virtualized guest that can directly control and interact with the hardware of the computing device.

BACKGROUND OF THE INVENTION

As should be appreciated, a virtual machine ('VM') within the context of emulation is a software construct or the like operating on a computing device or the like (i.e., a 'host') for the purpose of emulating a hardware or software system. Typically, although not necessarily, the VM is an application or the like, and may be employed on the host to instantiate a use application or the like while at the same time isolating such use application from such host device or from other applications on such host. In one typical situation, the host can accommodate one deployed VM or more than one deployed VM, each VM performing some predetermined function by way of resources available from the host.

Typically, although not necessarily, a host deploys each VM thereof in a separate partition. Such host may include a virtualization or emulation layer with an emulator or the like (hereinafter, 'emulator') that oversees each VM and thus manages supervisory aspects of each VM of the host, as well as acting as a link between each VM and the outside world.

Also typically, each use application executing within each VM is fully virtualized in that the VM is for all intents and purposes a computing machine, although in virtual form, and thus represents itself as such both to the use application thereof and to the outside world. In fact, such a fully virtualized use application is not even aware of the virtual form of its execution environment but instead presumes that such execution environment is indeed an actual computing device with hardware and software. Thus, any command issued from the use application with regard to hardware, such as a storage command, a network command, a print command, etc., is issued as if directed toward the corresponding piece of hardware, but in reality is directed toward a virtual representation of such corresponding piece of hardware. Accordingly, any such command must be intercepted by the emulator on the computing device and then must be redirected toward the actual corresponding piece of hardware on the computing device.

In general then, full or traditional virtualization focuses on creating a 'hermetic sandbox' in which an emulated guest executes. Said guest exists in an isolated state, with no ability of (directly) affecting any hardware outside the sandbox. Thus, the guest within a fully virtualizing VM operates under the illusion that it executes directly on a real hardware device. The sandboxing of the guest protects the host computing device from any accidental or intentional action performed by the guest from adversely affecting the host environment. Also, by having each guest within a corresponding hermetic sandbox, the host can instantiate any number of guests in independent sandboxes, and each guest can effectuate hardware services at the host by way of the emulator intercepting each request for such a hardware service and handling same on behalf of such requestor in a coordinated fashion such that multiple guests coexist within a single host.

However, full virtualization as implemented by a classic VM exacts a cost in that every such hardware request as intercepted in effect requires double processing, first by the guest within the VM and then by the emulator within the host. As a result, processing of such hardware requests is slowed, and functions requiring high speed may suffer from delays, resulting in the guest experiencing reduced emulation performance. As may be appreciated, such delays can be merely annoying or can in fact be crippling, depending on the nature of the guest and the tasks being performed thereby.

Thus, a need exists for a virtualization model that does not necessarily require double processing of each hardware request from a guest, first by the guest's own operating system and drivers within the VM and then by an emulator within a host. Instead, a need exists for a virtualization model that allows the guest to bypass the emulator in at least some circumstances and issue hardware requests directly to the host operating system or to the actual host hardware. In particular, a need exists for a partial virtualization model where a partially virtualized guest is aware of the virtual form of its environment and directs at least some hardware requests through a route that bypasses the emulator.

SUMMARY OF THE INVENTION

The aforementioned need is satisfied by the present invention in which a computing device has device hardware, an instantiated operating system, and an emulator instantiated on the instantiated operating system. The emulator issues actual hardware commands to the instantiated operating system and the instantiated operating system in turn issues corresponding actual hardware requests to the device hardware based on the actual hardware commands.

The computing device hosts a virtual machine on the emulator, where the virtual machine executes a guest operating system and an application instantiated on the guest operating system. The application issues guest hardware commands to the guest operating system and the guest operating system in turn issues corresponding guest hardware requests based on the guest hardware commands by way of any of a plurality of paths.

Such paths include a path to non-existent virtual hardware, where the emulator intercepts each such guest hardware request for the non-existent virtual hardware and processes such guest hardware request with a corresponding actual hardware command; a path to the instantiated operating system, where the instantiated operating system processes each such guest hardware request with a corresponding actual hardware request; and a path to the device hardware, where the device hardware directly processes each such guest hardware request.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
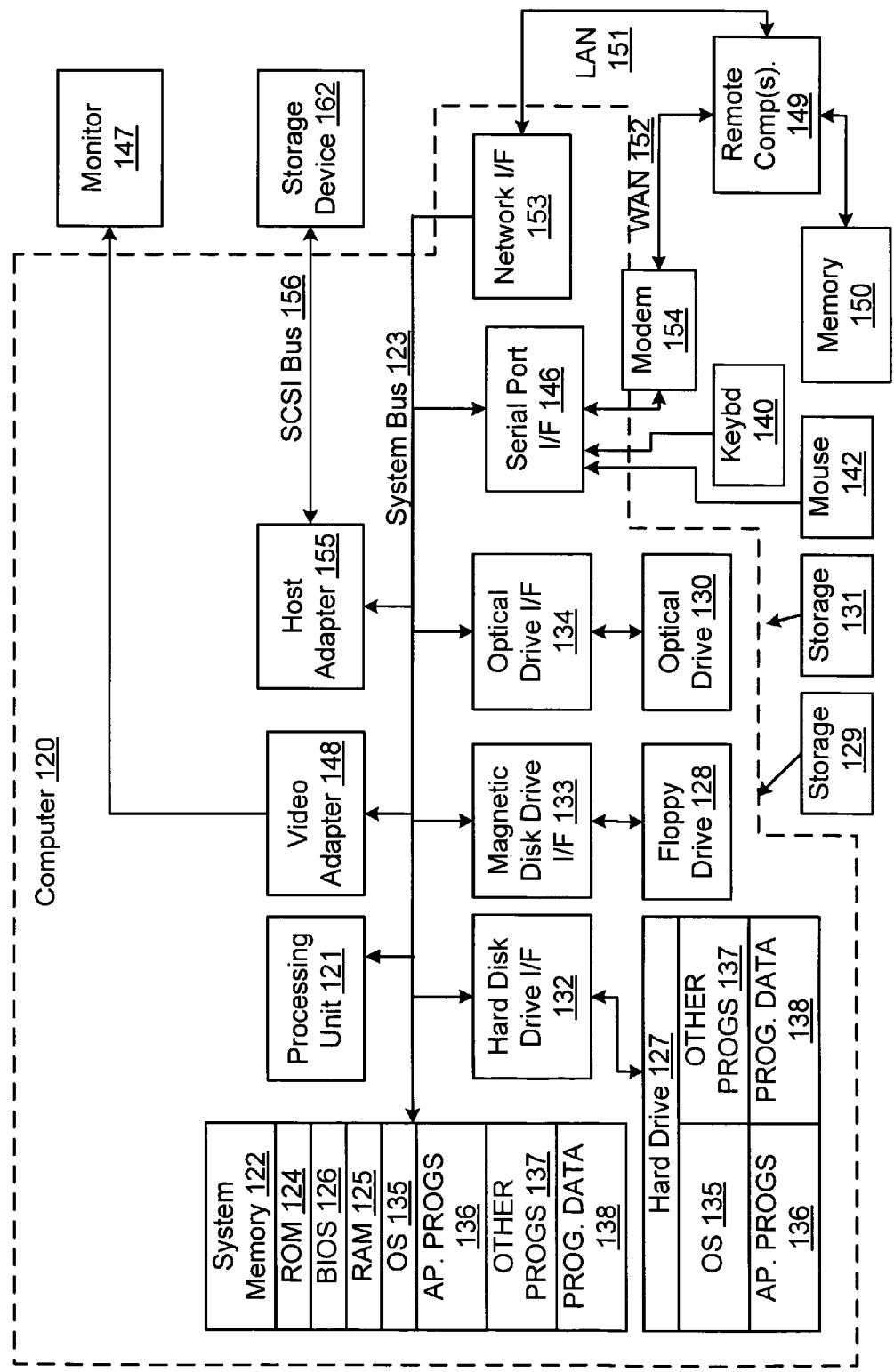
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including gaming consoles, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Host and Guest

Figure 2:
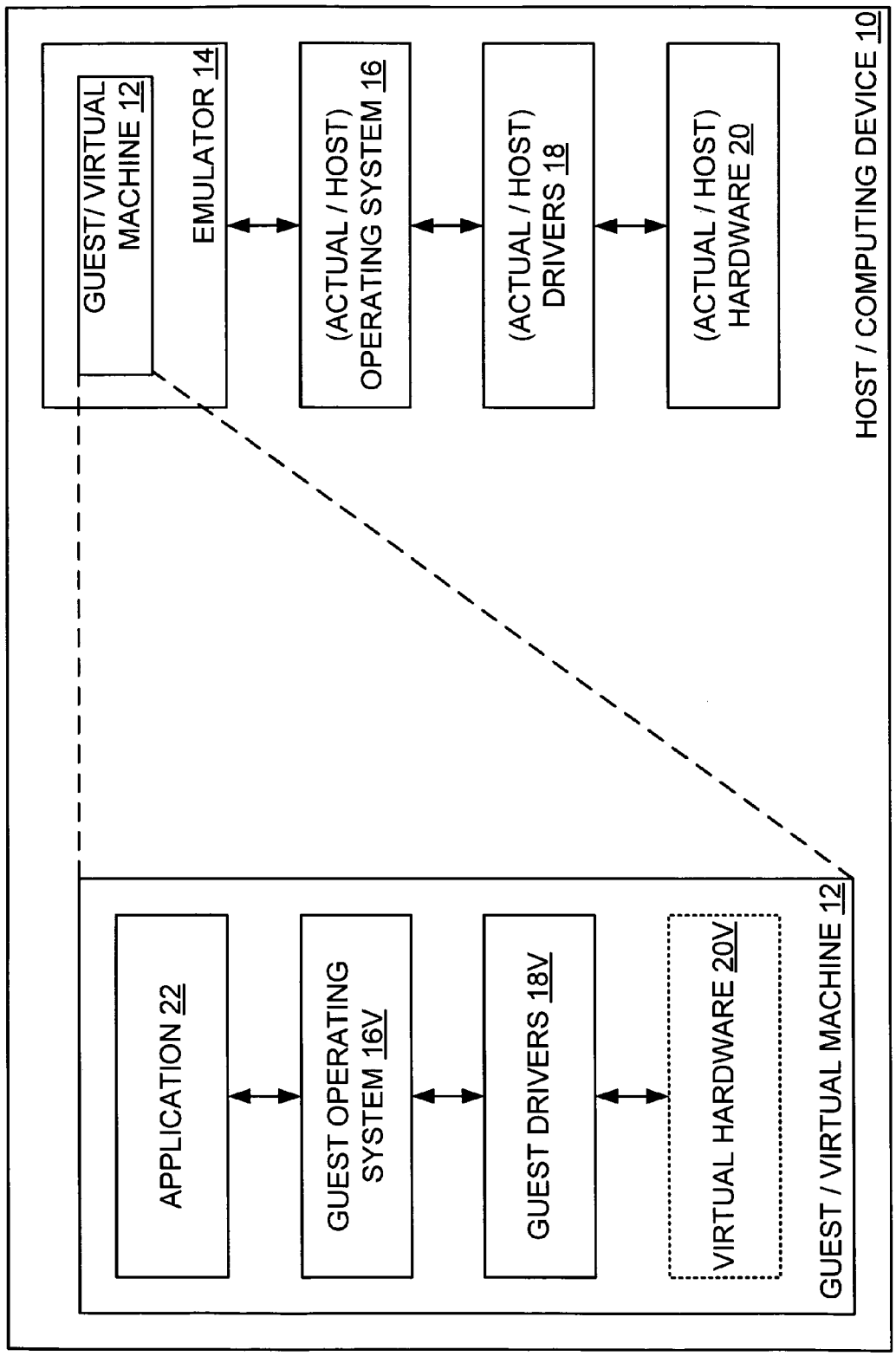
FIG. 2 is a block diagram showing a fully virtualized guest such as a VM deployed on a host such as a computing device.

Turning now to FIG. 2, it is seen that in a typical emulation scenario, a computing device 10 acts as a host for a guest 12 running thereon, such as a virtual machine (VM) 12, by running an emulator 14 as an application on such host 10, where the guest/VM 12 in effect runs on the emulator 14. Typically, and as shown, the emulator 14 runs on an operating system 16 of the computing device 10, and the operating system 16 either includes or has access to a collection of drivers 18 by which the operating system 16 issues hardware requests to hardware 20 of the computing device 10.

Note here that the host 10, guest 12, emulator 14, and operating system 16 may be any appropriate host, guest, emulator, and operating system host without departing from the spirit and scope of the present invention. Such a host, guest, emulator, and operating system are known or should be apparent to the relevant public and therefore need not be set forth herein in any detail beyond that which is already provided.

In a similar manner, the drivers 18 may be any appropriate drivers without departing from the spirit and scope of the present invention. Here, each driver 18 is provided to allow communication with a particular piece of hardware 20, another driver 18 or the like. That is, each driver 18 is likely provided by the provider of the corresponding entity, and is constructed to be able to communicate with the entity. Thus, and as an example, a provider of a storage device may also provide a corresponding storage device driver 18, the operating system 16 is programmed so that a hardware request from an application such as the emulator 14 for the storage device is directed by the operating system 16 to the storage device driver 18, and the hardware request as received by the storage device driver 18 is appropriately communicated by such driver 18 to the storage device in a form recognizable by such storage device.

Note that a driver 18 is not always necessary for accessing a corresponding piece of hardware 20. For example, memory is generally directly accessible by the operating system 16 of the host 10 without any intermediary driver 18. As will be set forth in more detail below, though, care must be taken when multiple avenues of access to memory are available, especially inasmuch as one accessor may corrupt or otherwise alter the data stored by another accessor, absent any controls to prevent such corruption or alteration.

Also note that a VM 12 is a software construct or the like that when operating on a host 10 emulates a hardware system. Thus, the VM 12 may employ the resources of the host 14 to instantiate a use application or the like while at the same time isolating such use application from such host 10 and other applications on such host 10. The guest 12 that executes within the VM 12 may perform most any function, including but not limited to acting as a data server, a network server, a mail server, a maintenance functionary, a data collector, a hardware monitor, an error corrector, a file manager, and the like. Typically, although not necessarily, a host 10 may accommodate a plurality of deployed VMs 12, where the guest 12 of each VM 12 independently performs some predetermined function. That said, in at least some circumstances it may be necessary to limit the host 10 to a single VM 12, as is set forth in more detail below. Notably, each VM 12 is for all intents and purposes a computing machine, although in virtual form.

Further note that the host 10 itself may be any appropriate computing device such as a desktop computer, a laptop computer, a handheld computer, a game console, a data assistant, a mainframe computer, or any other type of computing device with the functionality and capacity necessary to host one or more of the VMs 12. Bearing in mind that each VM 12 may require significant memory, I/O operations, storage space, and processor capacity from the host 10, however, and also bearing in mind that the host 10 may be expected to accommodate a fairly large VM 12 on the order of several gigabytes or more, the host 10 likely should have significant power and resources to be able to in fact accommodate such VM 12.

The hardware 20 as may be appreciated is any typical hardware associated with a computing device 10. Thus, such hardware 20 may be any hardware without departing from the spirit and scope of the present invention. For example, the hardware 20 may include but is not limited to the aforementioned memory; a storage device such as a disk drive, an optical drive, a magnetic drive, or the like, and/or a controller thereof; a clock; a data bus, an audio device or video device or the like or a controller thereof; an auxiliary processor; etc.

As shown in FIG. 2, the guest/VM 12 likely includes a virtual copy of the actual structure of FIG. 2 from the emulator 14 to the hardware 20, except that the emulator 14 is instead an application 22 and the hardware 20 does not in fact exist. In particular, in the guest/VM 12 running on the emulator 14, the application 22 runs on a guest operating system 16*v* that either includes or has access to a collection of guest drivers 18*v* by which the guest operating system 16*v* issues hardware requests to virtual hardware 20*v*.

In reality, and again, the virtual hardware 20*v* does not actually exist. Instead, and as was set forth above, the guest 12 on the VM 12 is traditionally or fully virtualized. Thus, the guest 12 on the host 10 operates under the illusion that such guest 12 executes directly on actual hardware 20. Accordingly, with a fully virtualized guest/VM 12, the emulator 14 of the host 10 intercepts each hardware request from the guest 12, and particularly from the guest driver 18*v* of the guest 12, and further processes such hardware request.

Thus, as seen in FIG. 2, if an application 22 operating within the guest 12 issues a guest command that requires virtual hardware activity, the guest command passes from the application 22 to the guest operating system 16*v*, which in turn issues a guest hardware request to a corresponding guest driver 18*v*, after which the guest driver 18*v* issues guest hardware instructions to the (non-existent) corresponding piece of virtual hardware 20*v*. Again, inasmuch as the corresponding piece of hardware is non-existent, the emulator 14 intercepts the guest hardware instructions and effectuates what is essentially a second, similar round of processing by issuing an actual command to the actual operating system 16, which in turn issues an actual hardware request to a corresponding actual driver 18, after which the actual driver 18 issues actual hardware instructions to the (existent) corresponding piece of hardware 20.

Note that the nature of the actual hardware commands, requests, and instructions depends on the nature of the guest hardware commands, requests, and instructions. For example, if the hardware involved is a data bus, a graphics device, or an audio device, the actual activity may mirror the virtual activity, especially inasmuch as both are trying to achieve the same goal—putting data on the bus, displaying graphics, producing audio. In contrast, if the hardware involved is a storage device, for example, the actual activity differs from the physical activity, especially if the virtual storage device is represented as an actual data file. At any rate, the emulator 14 as constructed is programmed to be able to properly effectuate guest requests from the guest 12 as actual activity at the host 10.

Partial Virtualization

As was set forth above, full virtualization such as that which was described in connection with FIG. 2 exacts a cost in that each command, request, and instruction is repeated, first by the guest 12 and then by the host 10. As a result, processing with regard to hardware slows, and functions requiring high speed may suffer. Such high speed functions of course depend on the application 22, although it may be generally said that functions that depend on data flow may especially suffer.

Accordingly, in the present invention, the guest 12 is only partially virtualized in that the guest 12 is allowed to bypass the emulator 14 in at least some circumstances. Of course, to do so, the guest 12 is made aware of the virtual form of its environment, at least insofar as such guest 12 is allowed to issue actual hardware instructions to actual corresponding pieces of hardware 20.

Figure 3:
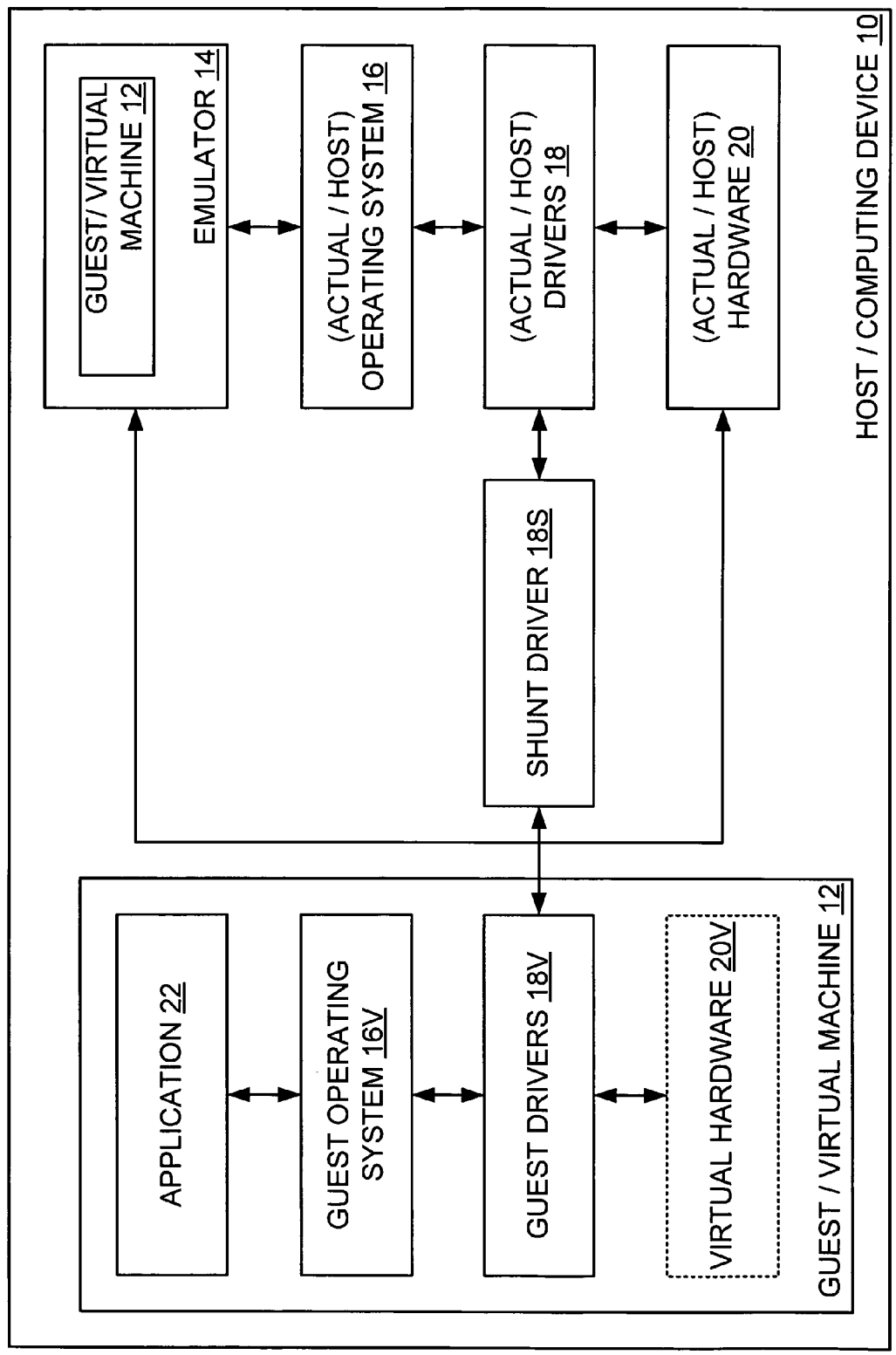
FIG. 3 is a block diagram showing a partially virtualized guest such as a VM deployed on a host such as a computing device in accordance with embodiments of the present invention.

In particular, and turning now to FIG. 3, it is seen that in the present invention, partial virtualization is achieved with essentially the same structure as that shown in FIG. 2, except that hardware instructions as issued by any guest driver 18*v* can take any of several paths, including to the emulator 14, to an actual driver 18, or directly to an actual piece of hardware 20. Thus, in at least some circumstances, the number of steps from the guest driver 18*v* to the actual hardware 20 is reduced, with a corresponding increase in overall processing speed.

Note, though, that by allowing a partially virtualized guest/VM 12 to be aware of the virtual state thereof and have direct access to actual hardware 20, the guest/VM 12 at the left side of FIG. 3 in effect can control hardware 20, even to the exclusion of the actual elements at the right side of such FIG. 3. Accordingly, the host 10 can only support one partially virtualized guest 12 at a time unless the host 10 includes arbitrating functionality (not shown) that can arbitrate between dueling guests 12 that would attempt to control the same piece of hardware 20 at the same time.

Nevertheless, a partially virtualized guest 12 is acceptable if only one guest 12 is to be deployed on the host 10. A prime example of a situation where only a single partially virtualized guest 12 is deployed on a host 10 is where a computing device 10 constructed based on a first operating system 16 is instead employed to support a second, differing operating system 16*v*. For example, it may be the case that a computing device 10 has a first operating system 16 compatible with a first processor of such computing device 10, but a user wishes to run a different, second operating system 16*v* compatible with a different, second processor on such computing device 10. Quite simply, the user cannot run the second operating system 16*v* directly on the first processor of the computing device 10 since such first processor of such computing device 10 is incompatible with the second operating system 16*v*.

However, and significantly, and in one embodiment of the present invention, the user can run an emulator 14 on the first operating system 16 of the computing device 10, where the emulator 14 emulates the second processor, and can run the second operating system 16*v* on the emulated second processor, especially inasmuch as the emulated second processor and the second operating system 16*v* are compatible. Most importantly, since it is not unreasonable to require the second operating system 16*v* to be the only guest 12 on the host 10, such guest 12 may be partially virtualized to boost overall emulation performance. That is, the second operating system 16*v* need not be in a hermetic sandbox because no other guests 12 would be expected to be deployed to such host 10, and thus the second operating system 16*v* can be given exclusive control of the hardware 20 of the guest 10.

To generalize, then, partial virtualization allows an emulated guest 12 to have direct control over hardware 20 and other resources of a host 10, which eliminates the overhead associated with virtualizing such hardware 20 and other resources. Although such partial virtualization requires that the host 10 be limited to virtualizing a single guest 12, such a limitation is acceptable in at least some circumstances.

In one embodiment of the present invention, and still referring to FIG. 3, each hardware instruction from any guest driver 18*v* is directed to any of the aforementioned paths based on the particular guest driver 18*v* and the command received by the guest driver 18*v*. That is, each particular guest driver 18*v* issues hardware instructions by way of a particular path according to the nature of the particular guest driver 18*v* and the type of request received thereby. For one example, a request with regard to network access would typically be issued to a guest network driver 18*v*, and such guest network driver 18*v* would typically issue a corresponding hardware instruction by way of a particular path that ultimately leads to actual network hardware 20.

As was set forth above, paths from the guest drivers 18*v* are presently envisioned to lead to the emulator 14, to an actual driver 18, or directly to an actual piece of hardware 20. Of course, other paths may be employed without departing from the spirit and scope of the present invention. Each path may be a direct communicative coupling or may be an indirect communicative coupling, also without departing from the spirit and scope of the present invention.

For example, and as seen in FIG. 3, the path from the guest drivers 18*v* to the emulator 14 and the path from the guest drivers 18*v* to the hardware 20 may be direct, while the path from the guest drivers 18*v* to the host drivers 18 may be by way of a shunt driver 18*s*. As may be appreciated, such a shunt driver 18*s* essentially acts as a bridge between the guest and actual drivers 18*v*, 18, and also may be employed to enforce some policy with regard to the types of instructions that can be sent from the guest drivers 18*v* to the actual drivers 18, as will be set forth in more detail below. Note that such a shunt driver 18*s* or the like may or may not be employed as necessary and/or advisable in any particular path without departing from the spirit and scope of the present invention. Thus, though not shown in FIG. 3, a similar shunt driver 18*s* or the like may for example be employed on the path from the guest drivers 18*v* to the actual hardware 20, perhaps at least to enforce some policy with regard to the types of instructions that can be sent from the guest drivers 18*v* to the actual hardware 20.

At this point, then, it is to be appreciated that the present invention is implemented for any particular guest operating system 16*v* by way of the guest drivers 16*v* thereof. Thus, a particular operating system that can be employed as the actual operating system 16 in one context may also be employed as the guest operating system 16*v* in another context, provided of course that the particular operating system is provided with a collection of drivers at least some of which can be host or actual drivers 18 for use on the right side of FIG. 3 when the particular operating system is acting as an actual operating system 16, and at least some of which can be guest drivers 18*v* for use on the left side of FIG. 3 when the particular operating system is acting as a guest operating system 16.

In one embodiment of the present invention, the path from the guest drivers 18*v* to the actual hardware 20 without any intermediary such as the shunt driver 18*s* is employed for hardware instructions that especially require speed and efficiency in the handling thereof. Typically, such especially speed-intensive hardware instructions include instructions to actual hardware 20 such as memory and at least some buses, such as a USB bus, a PCI bus, and the like. Here, and as may be appreciated, significant efficiencies are obtained inasmuch as such especially speed-intensive hardware instructions by directly accessing the hardware 20 avoid the emulator 14, the actual operating system 16, and the host drivers 18.

Note, though, that in at least some instances, allowing the VM/guest 12 to have such direct access to the hardware 20 may require the host 10 to forego at least some access to such hardware 20. In particular, if a guest 12 is directly accessing hardware 20 and the host 10 tries to access the same hardware 20, conflicts can occur and data can become lost or corrupted. Thus, the host 10 should be provided with an alternate access path by which such host 10 can in fact access such hardware 20. For example, the alternate path may in fact be from the operating system 16 or host drivers 18 of the host 10 to the guest drivers 18v of the guest 12, and may for example be employed by the host 10 to issue hardware instructions to a USB bus. As should be understood, with such alternate path, instructions from the host 10 in effect are handled by the guest 12. Inasmuch as memory directly accessed by the guest 12 is memory reserved for such guest 12, the host 10 should not be attempting to access such memory, and therefore no conflict should exist.

In one embodiment of the present invention, the path from the guest drivers 18v to the host drivers 18 by way of a shunt driver 18s is employed for hardware instructions that require speed and efficiency in the handling thereof, but that are not worthy of direct access for any of several reasons. Typically, such speed-intensive hardware instructions include instructions to actual hardware 20 such as storage devices, graphics devices, audio devices, network devices, and the like. Here, and as may be appreciated, efficiencies are obtained inasmuch as such speed-intensive hardware instructions avoid the emulator 14 and the actual operating system 16.

Reasons why particular hardware instructions are not worthy of direct access can be any reasons without departing from the spirit and scope of the present invention, Typically, one reason is that the host 10 requires access to the corresponding hardware, and the host drivers 18 handle the particular hardware instructions from both the host 10 and the guest 12 so as to avoid conflicts. Another reason may be that involving the host drivers 18 in the path allows the host 10 to exert some measure of control over the hardware instructions that are issued to the hardware 20 thereof. For example, the host drivers 18 may be employed to enforce some predefined policy upon such hardware instructions, perhaps as a matter of security or trust.

In at least some instances, direct access may be granted to the guest 12 for actual hardware where it can be assured that conflicts do not exist. For one example, if a portion of a storage device is dedicated to the guest 12, then it should not be the case that both the host 10 and the guest 12 would be attempting to access the same portion of the storage device, no conflict should therefore exist, and direct access could be provided. For another example, if it could be guaranteed that the host 10 would not employ a graphics device such as a monitor, the graphics device could then be dedicated to the exclusive use of the guest 12, and direct access to the graphics device could then be granted to such guest.

Note too that by allowing the operating system 16v of the guest 12 to access the hardware 20 of the host 10, it is possible that such guest 12 could access parts of the hardware 20 in ways that are not advisable or even that are dangerous. Most perilously, such improper access can expose the host 10 to security attacks when running an un-trusted guest 12. As an example of possible improper access, it may be the case that the host 10 is internally restricted from accessing certain portions of a storage device, but that the guest 12 is not likewise restricted. Accordingly, and in one embodiment of the present invention, at least some precautions are taken to prevent the hardware 20 of such host 10 from such improper access. For one example, and as was alluded to above, the host 10 may be equipped with a policy enforcement agent, such as the host drivers 18 enforcing predefined policy, by which such hardware 20 of such host 10 can in fact be protected from such improper access. For another example, the shunt driver 18s may in addition or in the alternative be employed to enforce predefined policy upon such hardware instructions. With regard to a guest 12 without storage device access restrictions, then, either the shunt driver 18s or the host drivers 18 can enforce such restrictions based on pre-defined policy by refusing to honor hardware instructions from the guest 12 that contravene such pre-defined policy.

As should be appreciated, the pre-existing path from the guest drivers 18v to the emulator 14 is employed for hardware instructions that are directed to the (virtualized) processor of the guest 12. As may be appreciated, such instructions must still be handled by such emulator 14 inasmuch as the (virtualized) processor of the guest 12 does not in fact exist. No increased efficiency is achieved by way of such path, but such path is nevertheless necessary. Note also that such pre-existing path to the emulator 14 may be employed for hardware instructions that do not require speed and efficiency in the handling thereof. Typically, such non-speed-intensive hardware instructions include instructions to actual hardware 20 such as clocks and certain low-level functionaries. In addition, such pre-existing path to the emulator 14 may be employed for hardware instructions that are seldom performed, and therefore do not warrant development of the guest drivers 18v that would be needed to handle such hardware instructions by way of a higher-speed path.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

It is to be noted that in setting forth the present invention, various entities are described as variously issuing commands, requests, and/or instructions to other entities. It is to be understood that such terms are generally interchangeable except in circumstances that would dictate otherwise.

In the foregoing description, it can be seen that the present invention comprises a new and useful virtualization model that does not necessarily require double processing of each hardware request from a guest 12, first by the guest 12 and then by a host 10 with an emulator 14. Instead, the virtualization model allows the guest 12 to bypass the emulator 14 in at least some circumstances and issue hardware requests directly to the actual hardware 20, perhaps by way of host drivers 18 at the host 10. In such model, a partially virtualized guest 12 is aware of the virtual form thereof and directs at least some hardware requests through a route that bypasses the emulator 14.

It should be appreciated that changes could be made to the embodiments described above without departing from the inventive concepts thereof. As but one example, although the present invention is primarily set forth in terms of a guest 12 executing within a VM 12, such guest 12 may alternately be some other construct without departing from the spirit and scope of the present invention. Similarly, although the present invention is primarily set forth in terms of drivers 18, 18v issuing hardware instructions, such hardware instructions may alternately be issued from some other construct without departing from the spirit and scope of the present invention, such as for example the respective operating system 16, 16v itself. It should be understood, therefore, that this invention is not limited to the particular embodiments disclosed, but it is intended to cover modifications within the spirit and scope of the present invention as defined by the appended claims.

The invention claimed is:

1. A computing device having device hardware, an instantiated operating system, and an emulator instantiated on the instantiated operating system, the emulator issuing actual hardware commands to the instantiated operating system and the instantiated operating system in turn issuing corresponding actual hardware requests to the device hardware based on the actual hardware commands, the computing device hosting a virtual machine on the emulator, the virtual machine executing a guest operating system and an application instantiated on the guest operating system, the application issuing guest hardware commands to the guest operating system and the guest operating system in turn issuing corresponding guest hardware requests based on the guest hardware commands by way of any of a plurality of paths including:

a path to non-existent virtual hardware, the emulator intercepting each such guest hardware request for the non-existent virtual hardware and processing such guest hardware request with a corresponding actual hardware command, a path to the instantiated operating system, the instantiated operating system processing each such guest hardware request with a corresponding actual hardware request, and a path to the device hardware, the device hardware directly processing each such guest hardware request wherein the path to the device hardware is employed for pre-defined types of guest hardware requests and prevents the instantiated operating system from issuing corresponding types of actual hardware requests to the device hardware, and wherein the instantiated operating system instead issues such corresponding types of actual hardware requests to the guest operating system by way of a path thereto, the guest operating system processing each such actual hardware request with a corresponding guest hardware request.

2. The computing device of claim 1 further having a collection of instantiated drivers, the emulator issuing actual hardware commands to the instantiated operating system, the instantiated operating system in turn issuing corresponding actual hardware requests to the instantiated drivers based on the actual hardware commands, the instantiated drivers in turn issuing corresponding actual hardware instructions to the device hardware based on the actual hardware requests, wherein the virtual machine further has a collection of guest drivers, the application issuing guest hardware commands to the guest operating system, the guest operating system in turn issuing corresponding guest hardware requests to the guest drivers based on the guest hardware commands, the guest drivers in turn issuing corresponding guest hardware instructions based on the guest hardware requests by way of any of a plurality of paths including:

a path to non-existent virtual hardware, the emulator intercepting each such guest hardware instruction for the non-existent virtual hardware and processing such guest hardware instruction with a corresponding actual hardware command, a path to the instantiated guest drivers, the instantiated guest drivers processing each such guest hardware instruction with a corresponding actual hardware instruction, and a path to the device hardware, the device hardware directly processing each such guest hardware instruction.

3. The computing device of claim 1 hosting only a single virtual machine on the emulator.

4. The computing device of claim 1 wherein the device hardware is selected from among memory; a storage device, a clock, a data bus, an audio device, and a video device.

5. The computing device of claim 1 further comprising a shunt driver on at least one of the path to the instantiated operating system and the path to the device hardware, the shunt driver enforcing policy with regard to permissible hardware requests that are allowed to be sent by way of each of such paths.

6. The computing device of claim 1 wherein the path to the device hardware is employed for guest hardware requests for at least one of memory and a data bus.

7. A computer implemented method for instantiating a virtual machine hosted on a computing device having device hardware, comprising:

instantiating an operating system on the computing device, and instantiating an emulator on the instantiated operating system, the emulator issuing actual hardware commands to the instantiated operating system and the instantiated operating system in turn issuing corresponding actual hardware requests to the device hardware based on the actual hardware commands, hosting the virtual machine on the emulator, the virtual machine executing a guest operating system and an application instantiated on the guest operating system, the application issuing guest hardware commands to the guest operating system and the guest operating system in turn issuing corresponding guest hardware requests based on the guest hardware commands by way of any of a plurality of paths including:

a path to non-existent virtual hardware, the emulator intercepting each such guest hardware request for the non-existent virtual hardware and processing such guest hardware request with a corresponding actual hardware command, a path to the instantiated operating system, the instantiated operating system processing each such virtual hardware request with a corresponding actual hardware request; and a path to the device hardware, the device hardware directly processing each such virtual hardware request; and instantiating a shunt driver on at least one of the path to the instantiated operating system and the path to the device hardware, the shunt driver enforcing policy with regard to permissible hardware requests that are allowed to be sent by way of each of such paths.

8. The method of claim 7 wherein the computing device further has a collection of instantiated drivers, the emulator issuing actual hardware commands to the instantiated operating system, the instantiated operating system in turn issuing corresponding actual hardware requests to the instantiated drivers based on the actual hardware commands, the instantiated drivers in turn issuing corresponding actual hardware instructions to the device hardware based on the actual hardware requests, wherein the virtual machine further has a collection of guest drivers, the application issuing guest hardware commands to the guest operating system, the guest operating system in turn issuing corresponding guest hardware requests to the guest drivers based on the guest hardware commands, the guest drivers in turn issuing corresponding guest hardware instructions based on the guest hardware requests by way of any of a plurality of paths including:

a path to non-existent virtual hardware, the emulator intercepting each such guest hardware instruction for the non-existent guest hardware and processing such guest hardware instruction with a corresponding actual hardware command, a path to the instantiated guest drivers, the instantiated guest drivers processing each such guest hardware instruction with a corresponding actual hardware instruction, and a path to the device hardware, the device hardware directly processing each such guest hardware instruction.

9. The method of claim 7 wherein the device hardware is selected from among memory; a storage device, a clock, a data bus, an audio device, and a video device.

10. The method of claim 7 wherein the path to the device hardware is employed for guest hardware requests for at least one of memory and a data bus.

11. The method of claim 7 wherein the path to the device hardware is employed for pre-defined types of guest hardware requests and prevents the instantiated operating system from issuing corresponding types of actual hardware requests to the device hardware, and wherein the instantiated operating system instead issues such corresponding types of actual hardware requests to the guest operating system by way of a path thereto, the guest operating system processing each such actual hardware request with a corresponding guest hardware request.

12. A computer-readable medium having stored thereon computer-executable instructions for implementing a virtual machine, the virtual machine being hosted on a computing device having device hardware, an instantiated operating system, and an emulator instantiated on the instantiated operating system, the emulator issuing actual hardware commands to the instantiated operating system and the instantiated operating system in turn issuing corresponding actual hardware requests to the device hardware based on the actual hardware commands, the virtual machine being hosted on the emulator, the virtual machine executing a guest operating system and an application instantiated on the guest operating system, the application issuing guest hardware commands to the guest operating system and the guest operating system in turn issuing corresponding guest hardware requests based on the guest hardware commands by way of any of a plurality of paths including:

a path to non-existent virtual hardware, the emulator intercepting each such guest hardware request for the non-existent virtual hardware and processing such guest hardware request with a corresponding actual hardware command, a path to the instantiated operating system, the instantiated operating system processing each such guest hardware request with a corresponding actual hardware request, and a path to the device hardware, the device hardware directly processing each such guest hardware request wherein the path to the device hardware is employed for pre-defined types of guest hardware requests and prevents the instantiated operating system from issuing corresponding types of actual hardware requests to the device hardware, and wherein the instantiated operating system instead issues such corresponding types of actual hardware requests to the guest operating system by way of a path thereto, the guest operating system processing each such actual hardware request with a corresponding guest hardware request.

13. The medium of claim 12 wherein the computing device further has a collection of instantiated drivers, the emulator issuing actual hardware commands to the instantiated operating system, the instantiated operating system in turn issuing corresponding actual hardware requests to the instantiated drivers based on the actual hardware commands, the instantiated drivers in turn issuing corresponding actual hardware instructions to the device hardware based on the actual hardware requests, wherein the virtual machine further has a collection of guest drivers, the application issuing guest hardware commands to the guest operating system, the guest operating system in turn issuing corresponding guest hardware requests to the guest drivers based on the guest hardware commands, the guest drivers in turn issuing corresponding guest hardware instructions based on the guest hardware requests by way of any of a plurality of paths including:

a path to non-existent virtual hardware, the emulator intercepting each such guest hardware instruction for the non-existent virtual hardware and processing such guest hardware instruction with a corresponding actual hardware command, a path to the instantiated guest drivers, the instantiated guest drivers processing each such guest hardware instruction with a corresponding actual hardware instruction, and a path to the device hardware, the device hardware directly processing each such guest hardware instruction.

14. The medium of claim 12 wherein the device hardware is selected from among memory; a storage device, a clock, a data bus, an audio device, and a video device.

15. The medium of claim 12 wherein the virtual machine further comprises a shunt driver on at least one of the path to the instantiated operating system and the path to the device hardware, the shunt driver enforcing policy with regard to permissible hardware requests that are allowed to be sent by way of each of such paths.

16. The medium of claim 12 wherein the path to the device hardware is employed for guest hardware requests for at least one of memory and a data bus.

* * * * *